(12) United States Patent
Stefani et al.

(10) Patent No.: US 7,676,525 B2
(45) Date of Patent: Mar. 9, 2010

(54) EFFICIENT QUERY PROCESSING OF MERGE STATEMENT

(75) Inventors: Stefano Stefani, Issaquah, WA (US); Naveen Prakash, Sammamish, WA (US); Craig S. Freedman, Sammamish, WA (US); Marcel van der Holst, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 11/772,495

(22) Filed: Jul. 2, 2007

(65) Prior Publication Data

US 2009/0012980 A1 Jan. 8, 2009

(51) Int. Cl.
*G06F 7/00* (2006.01)

(52) U.S. Cl. ..................................... 707/808
(58) Field of Classification Search ............... None
See application file for complete search history.

(56) References Cited

U.S. PATENT DOCUMENTS

| | | | |
|---|---|---|---|
| 6,122,644 A * | 9/2000 | Graefe et al. ............... | 707/202 |
| 6,829,600 B2 | 12/2004 | Gu et al. ........................ | 707/3 |
| 7,155,432 B2 | 12/2006 | Eikenhorst et al. ............. | 707/5 |
| 2004/0153440 A1 | 8/2004 | Halevy et al. .................. | 707/3 |
| 2004/0199519 A1* | 10/2004 | Gu et al. ...................... | 707/100 |
| 2005/0027690 A1 | 2/2005 | Zhang et al. .................... | 707/3 |
| 2005/0091256 A1 | 4/2005 | Rathakrishnan et al. ..... | 707/102 |
| 2005/0138010 A1 | 6/2005 | Bernal et al. ................... | 707/3 |
| 2005/0187893 A1 | 8/2005 | Ashwin et al. ................. | 707/1 |
| 2006/0224563 A1 | 10/2006 | Hanson et al. ................. | 707/2 |

OTHER PUBLICATIONS

Blakeley, J.A. et al., "Distributed/Heterogeneous Query Processing in Microsoft SQL Server", *Proceedings of the 21st International Conference on Data Engineering*, 2005, 12 pages, http://ieeexplore.ieee.org.

Fitzpatrick, A., "Anecdotes, A Well-Intentioned Query and the Halloween Problem", *IEEE Annals of the History of Computing*, 2002, 86 thru 89, http://ieeexplore.ieee.org.

Graefe, G., "Implementing Sorting in Database Systems", *ACM Computing Surveys*, 2006, 38(3), 37 pages, http://delivery.acm.org.

Graefe, G., "Executing Nested Queries", http://scholar.google.com, 24 pages.

* cited by examiner

*Primary Examiner*—Charles Rones
*Assistant Examiner*—Belix M Ortiz
(74) *Attorney, Agent, or Firm*—Woodcock Washburn LLP

(57) ABSTRACT

Disclosed are systems and methods for optimization and efficient processing of MERGE statements. MERGE allows performing a mix of inserts, updates, and deletes in a single statement, and introduces new challenges compared to legacy DML statements, where the kind of action to be performed is hard-coded and known at compile time. Such optimizations may include Halloween Protection detection for MERGE statements, optimized prevention of non-deterministic MERGE statements, in-place inserts for MERGE statements scanning the "Read Instance" of the target table, and optimized execution of MERGE statements seeking the "Read Instance" of the target table. Such optimizations may be fundamental in order to ensure proper performance and reliable processing times.

20 Claims, 5 Drawing Sheets

EFFICIENT QUERY PROCESSING OF MERGE STATEMENT

BACKGROUND

The MERGE statement is a data manipulation language (DML) statement that may be employed to update a target using data from a source. Each of the target and the source may be a table, for example. Rows in the target that match corresponding rows in the source can be deleted or updated as specified in the MERGE statement. Rows that do not exist in the target can be inserted. Thus, MERGE allows performing a mix of inserts, updates, and deletes in a single statement.

Such a statement introduces new challenges compared to legacy DML statements, where the kind of action to be performed is hard-coded and known at compile time. To effect a MERGE, it must first be determined whether or not a corresponding row exists in the target. If not, then the row from the source may be inserted into the target. If the row exists in the target, then it must be determined whether to update the target row, delete it, or leave it unchanged, based on the source. Sometimes, such queries are nondeterministic, such as where multiple rows in the source correspond to only a single row in the target. Also, the actions to be taken may depend on the order in which the rows are processed.

There is an ongoing desire for more efficient query processing of MERGE statements.

SUMMARY

Disclosed herein are a number of optimizations that provide more efficient processing of MERGE statements. Such optimizations may include: "Halloween Protection" detection for MERGE statements; optimized prevention of non-deterministic MERGE statements; in-place inserts for MERGE statements scanning a "Read Instance" of the target; and optimized execution of MERGE statements seeking the "Read Instance" of the target. Such optimizations may be fundamental in order to ensure proper performance and reliable processing times.

Halloween Protection Detection for MERGE Statements

DML Query Plans are typically divided in two parts—a "read" portion to provide the set of rows to be inserted/updated/deleted, and a "write" portion to apply the changes to the target. Depending on the shape of the query plan, the read and write portion could side-effect each other if not separated through a worktable. This separation is referred to as "Halloween Protection." In the vast majority of cases, introducing this separation harms performance. Accordingly, to avoid data corruptions and incorrect results, it may be desirable to introduce Halloween Protection in the query plan only when strictly necessary.

A MERGE algorithm as described herein may be employed to detect when Halloween Protection is required, based on the syntax of the command and the actions being performed, the indexes present on the tables involved, and the shape of the query plan. Such an algorithm may ensure that Halloween Protection is introduced only when strictly required.

Optimized Prevention of Non-Deterministic MERGE Statements

A MERGE whose source table is not unique could attempt to modify the same row more than once. This is not permitted because it would likely cause the outcome of the statement to be non deterministic.

A MERGE algorithm as described herein may be employed to detect, at compile time, based on the syntax and actions being performed, and the indexes on the source and target tables, whether the statement could be such to modify the same row twice. When it is detected that the statement could possibly attempt to modify the same row twice, a runtime validation step may be added to the query plan to prevent nondeterministic behavior. The validation may be implemented in a way to minimize the effect on performance.

Statements Scanning the "Read Instance" Of the Target Table

When a MERGE query plan does not contain Halloween Protection, an optimization may be attempted to reuse rows and pages being read from the target instance being joined with the source to qualify the rows to insert. When the source and target are being scanned and joined with a merge join, and a match is not found on the target, the hole may be filled with an insert. The page containing the current outstanding row from the target scan will likely be the same where the row needs to be inserted, because the new row will be inserted right before the currently outstanding row in the leaf level of the B-Tree. If the operation can be done in place on the page, checking the outstanding page can save the B-Tree traversal required to insert the row.

Statements Seeking the "Read Instance" of the Target Table

An optimized application program interface ("API") may be used to implement MERGE actions (insert, update, delete) with a single B-Tree traversal per affected row. In other words, when such an API is enabled, each action may be performed in the target table with one B-Tree traversal. This may provide an advantage over multi-statement implementations, which, at the very least, need two B-Tree traversals in the worst case scenario. For example, a batch could attempt to update an existing row (one traversal), and if the update did not touch any row then an insert will be made (another traversal).

An optimized API as disclosed herein may tend to improve OLTP-like workloads, for example. Such an API may be enabled by splitting the MERGE Query Execution iterator into two. The first iterator may attempt to insert a row in the target. If the row exists already, then it will be consumed by another MERGE iterator on top to perform an in-place update. In essence, an insertion may be attempted before proving whether the row exists already. For example, if a row already exists, then the already-existing row may be used instead of generating a spurious "unique key violation" error. The optimization may be enabled only when the target table has a unique index.

DETAILED DESCRIPTION

Exemplary Computing Arrangement

Figure 1:
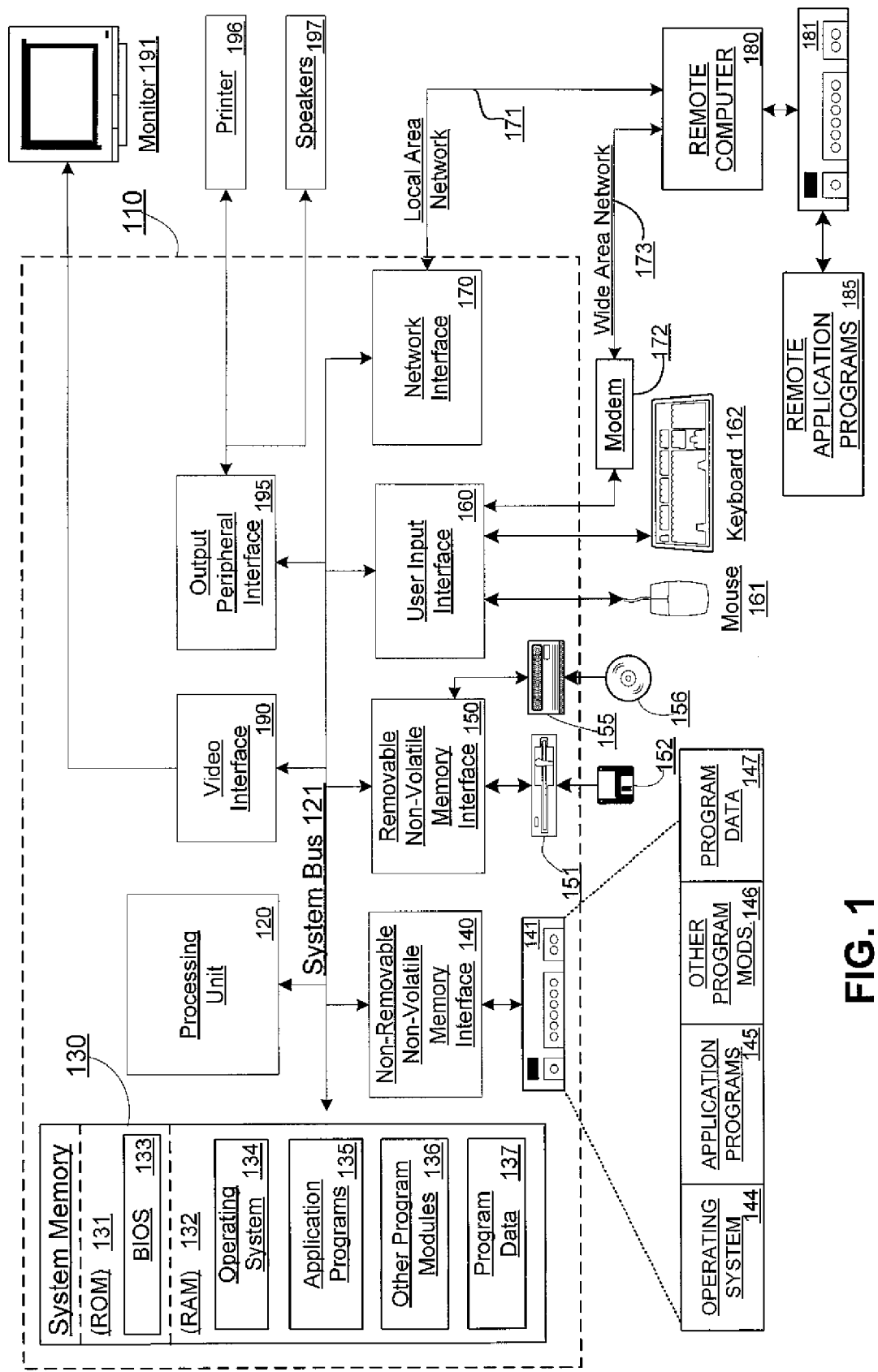
FIG. 1 is a block diagram of an example computing environment in which example embodiments and aspects may be implemented.

FIG. 1 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Halloween Protection Detection for MERGE Statements

Figure 2:
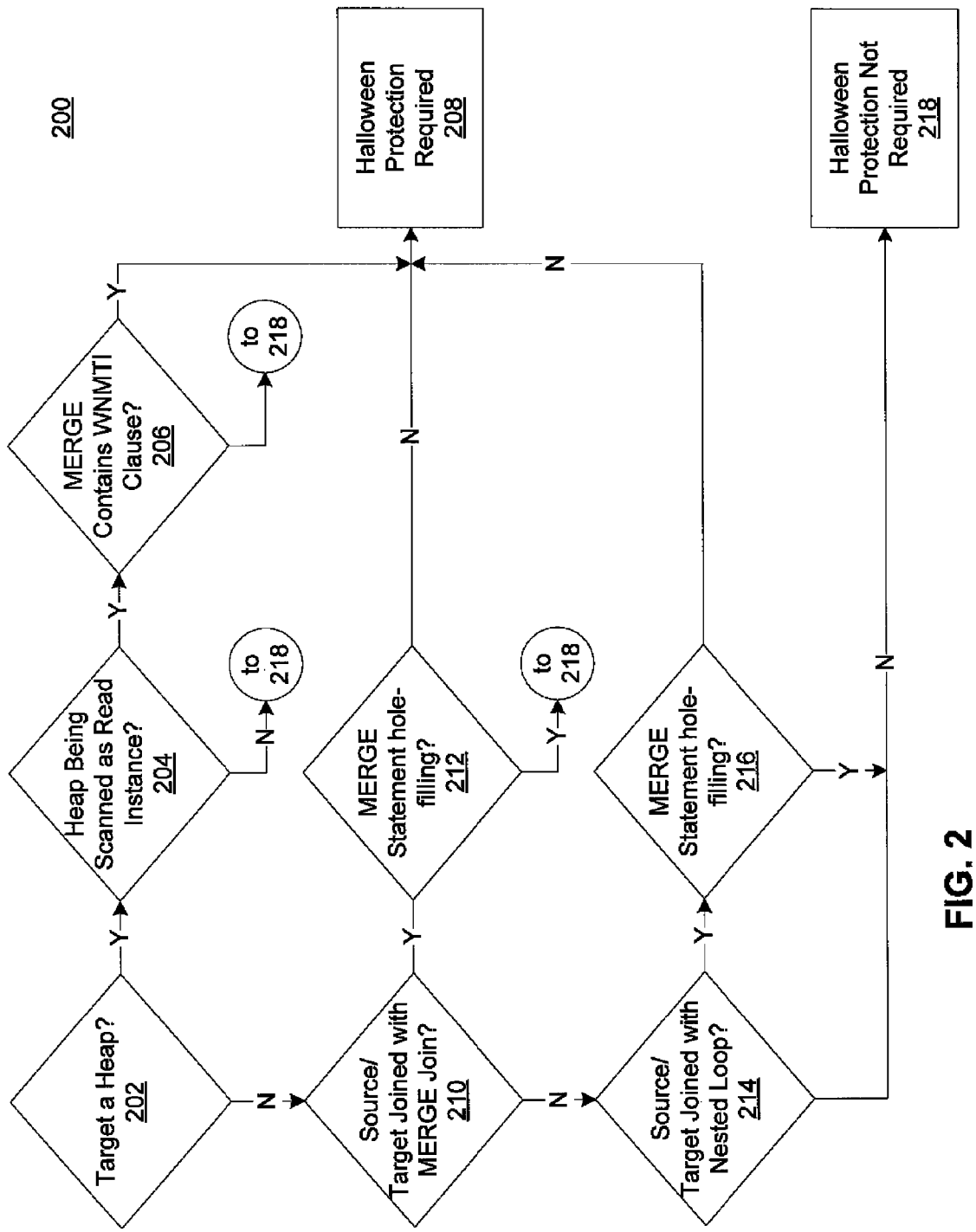
FIG. 2 is a flowchart of a method for "Halloween Protection" detection for MERGE statements.

FIG. 2 is a flowchart of a method 200 for "Halloween Protection" detection for MERGE statements. Such a method may be based on the fact that the "read" portion of a MERGE query plan always contains a "join" between the source and the target to qualify the rows to insert, update, or delete. The instance of the target joined with the source may be referred to as the "Read Instance."

A MERGE statement may be defined as "hole-filling" for a column in the target if: 1) the column is involved in the join predicate between the source and the target, 2) the MERGE statement contains a WHEN NOT MATCHED THEN INSERT clause, and 3) the clause assigns to the column the value to which it is being compared in the join predicate. In other words, the MERGE statement may be defined as "hole-filling" for a column if the INSERT clause exactly populates the value that was found missing in the WHEN NOT MATCHED clause.

If the key or partitioning columns of the index being scanned or sought of the "Read Instance" intersect with the columns being updated in the WHEN MATCHED THEN UPDATE clause of the MERGE statement, then Halloween Protection is required. Otherwise, the update could trigger a movement of the row in the B-Tree such to possibly make the statement process the row twice. MERGE statements are required to process (e.g., insert, update, or delete) the same target row at most once.

At 202, a determination is made as to whether the target is a heap. As used herein, the term "heap" refers to a table that is not organized as an index, e.g., a table whose rows are stored in no specific order. If, at 202, it is determined that the target is a heap, then, at 204, it is determined whether the heap is being scanned as "Read Instance." If, at 204, it is determined that the heap is being scanned as Read Instance, then, at 206, it is determined whether the MERGE statement contains a WHEN NOT MATCHED THEN INSERT clause. If, at 206, it is determined that the MERGE statement contains a WHEN NOT MATCHED THEN INSERT clause, then, at 208, it is determined that Halloween Protection is required, because heaps are unordered data structures and newly-inserted rows could be read by the scan. If this were to occur, then the newly-inserted rows could be immediately updated or deleted, generating erroneous results.

At 210, a determination is made as to whether the source and target are joined with a merge join. If, at 210, it is determined that the source and target are joined with a merge join, then, at 212, a determination is made as to whether the MERGE statement is hole-filling for the target merge join keys. If, at 212, it is determined that the MERGE statement is not hole-filling for the target merge join keys, then, at 208, it is determined that Halloween Protection is required, because newly inserted rows could be introduced in arbitrary positions of the Read Instance index being scanned.

At 214, a determination is made as to whether the source and target are joined with a nested loop join. If, at 214, it is determined that the source and target are joined with a nested loop join, then, at 216, a determination is made as to whether the MERGE statement is hole-filling for the keys of the Read Instance index being sought that are compared with the source join keys in the seek predicate. If, at 216, it is determined that the MERGE statement is not hole-filling for the keys of the Read Instance index being sought, then, at 208, it is determined that Halloween Protection is required, because newly inserted rows could be introduced in arbitrary positions of the "Read Instance" index being sought.

If it is determined that none of the above-described conditions is met, then, at 218, it is determined that Halloween Protection is not required.

Optimized Prevention of Non-Deterministic MERGE Statements

Figure 3:
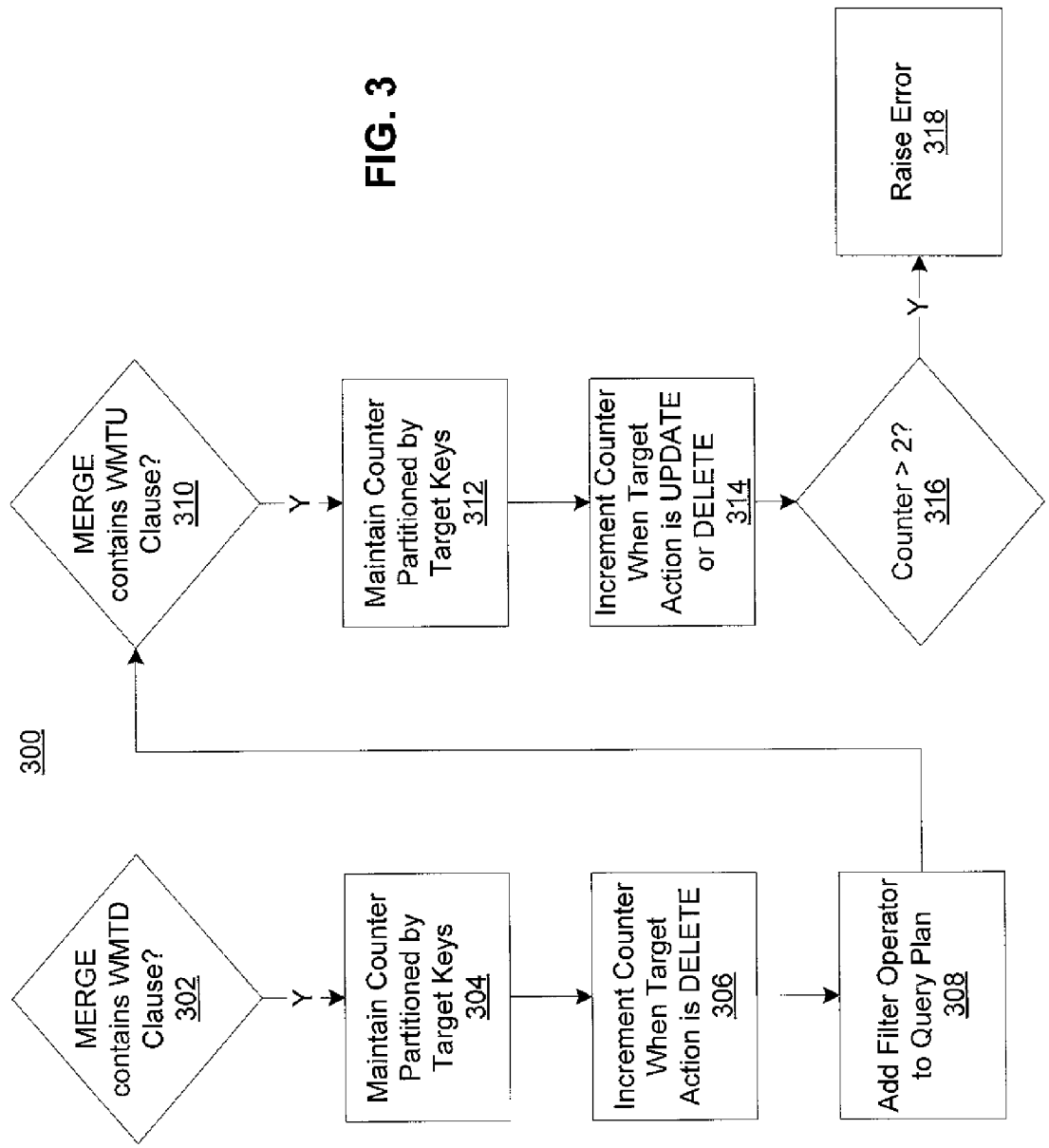
FIG. 3 is a flowchart of a method for prevention of non-deterministic MERGE statements.

FIG. 3 is a flowchart of a method 300 for prevention of non-deterministic MERGE statements. A MERGE statement containing either a WHEN MATCHED THEN UPDATE or a WHEN MATCHED THEN DELETE clause could attempt to update or delete the same row more than once if the source does not have a unique index on the join keys. Duplicate join keys from the source could lead to duplicate attempts to update or delete the same matching row in the target. If such a condition is detected during the compilation of the MERGE statement, the query plan will be augmented with appropriate operators that will raise errors preventing multiple attempts to update the same row, and discard duplicate attempts to delete the same row.

According to the method 300, more than one of the same operation may not be allowed because it could be non-deterministic. At 302, a determination is made as to whether the MERGE statement contains a WHEN MATCHED THEN DELETE clause. If, at 302, it is determined that the MERGE statement contains a WHEN MATCHED THEN DELETE clause, then the query plan may be augmented by introducing an operator computing a "Ranking Window Function" before the changes are applied against the target. At 304, the Ranking Window Function may maintain a counter partitioned by the target keys. The counter may be incremented, at 306, whenever the action being attempted against the target is a DELETE. At 308, a filter operator may then be added to the plan, to consume the data stream delivered by the Ranking Window Function computation, and to remove rows with a counter greater than one, i.e., to discard duplicate attempts to delete the same row.

At 310, a determination is made as to whether the MERGE statement contains a WHEN MATCHED THEN UPDATE clause. If, at 310, it is determined that the MERGE statement contains a WHEN MATCHED THEN UPDATE clause, the query plan may be further augmented with another Ranking Window Function operator. At 312, the Ranking Window Function may maintain a counter partitioned by the target keys. The counter may be incremented, at 314, whenever the action being attempted against the target is an UPDATE or a DELETE. If it is determined, at 316, that the counter for a given row reaches two, then, at 318, an error may be raised, because the statement is attempting to update or delete the same row.

In-Place Inserts for MERGE Statements Scanning a "Read Instance" of a Target

Figure 4:
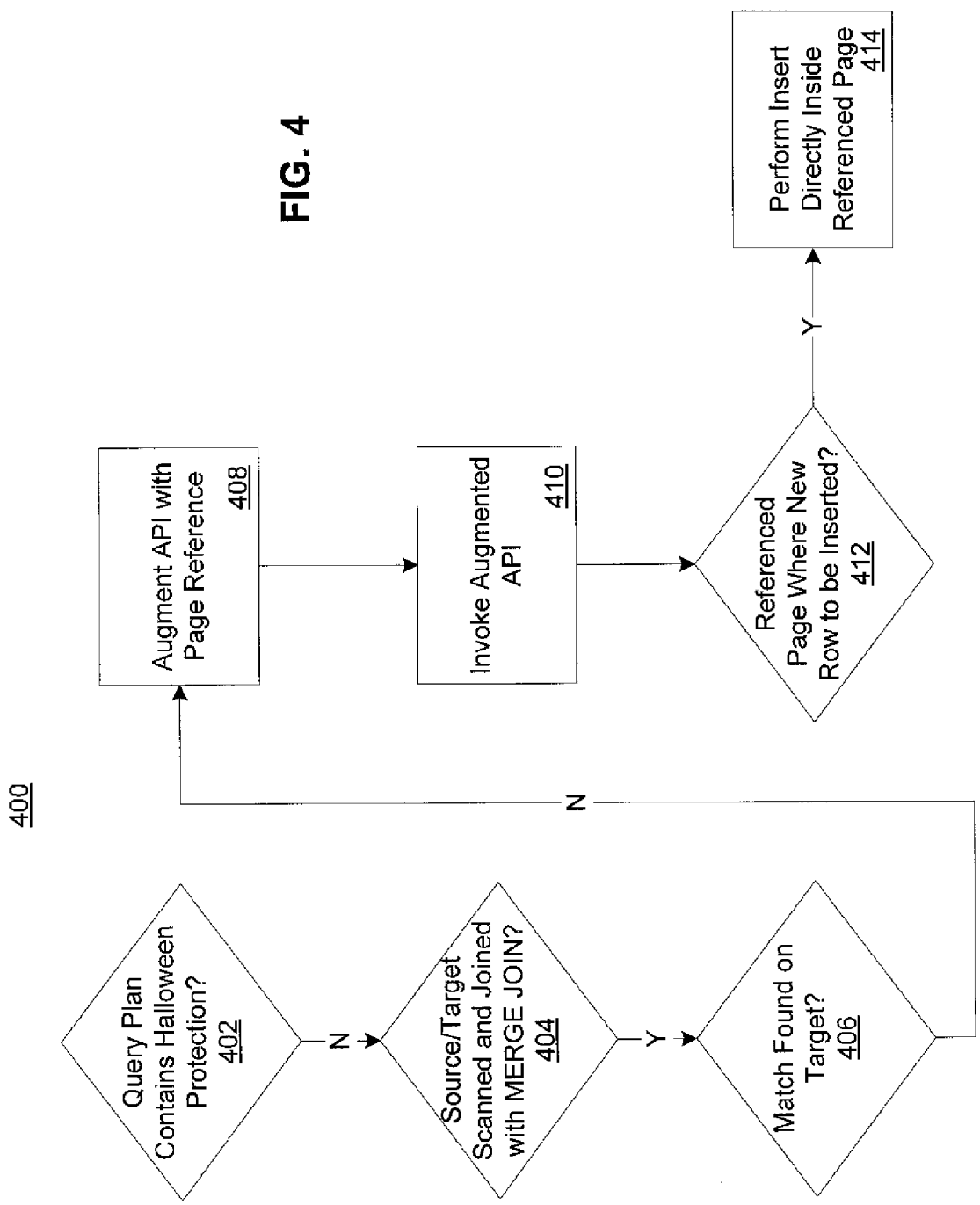
FIG. 4 is a flowchart of a method for in-place inserts for MERGE statements scanning a "Read Instance" of a target.

FIG. 4 is a flowchart of a method 400 for in-place inserts for MERGE statements scanning a "Read Instance" of a target. When a MERGE query plan does not contain Halloween Protection, an optimization may be attempted to reuse pages being read from the target instance being joined with the source to qualify the rows to insert. When the source and target are being scanned and joined with a merge join, and a match is not found on the target, the hole may be filled with an insert action. The page containing the current outstanding row from the target "Read Instance" index scan may be the same where the row needs to be inserted, because the new row will be inserted right before the currently outstanding row in the leaf level of the B-Tree. Checking the outstanding page can save the B-Tree traversal required to insert the row, if the operation can be done in place on the page.

According to the method 400, a determination is made, at 402, as to whether the query plan contains Halloween protection. If, at 402, it is determined that the query plan does not contain Halloween protection, then, at 404, it is determined whether the source and target are being scanned with a merge join. If, at 404, it is determined that the source and target are being scanned with a merge join, then, at 406, it is determined whether a match is found on the target.

If, at 406, a match is not found on the target, then, at 408, the Storage Engine API used to insert a row may be augmented with an optional parameter containing a page reference. At 410, the augmented API may be invoked with a reference to the currently outstanding page of the target index scan. When such a page reference is present, the Storage Engine may determine, at 412, whether the page is the one where the new row needs to be inserted. This check is very cheap, because it simply needs to compare the lowest and highest index key column values for the rows currently stored in the page. If the key of the new row to be inserted fits in between, then, at 414, the insert can be performed directly inside the page, without B-Tree traversals being required.

Figure 5:
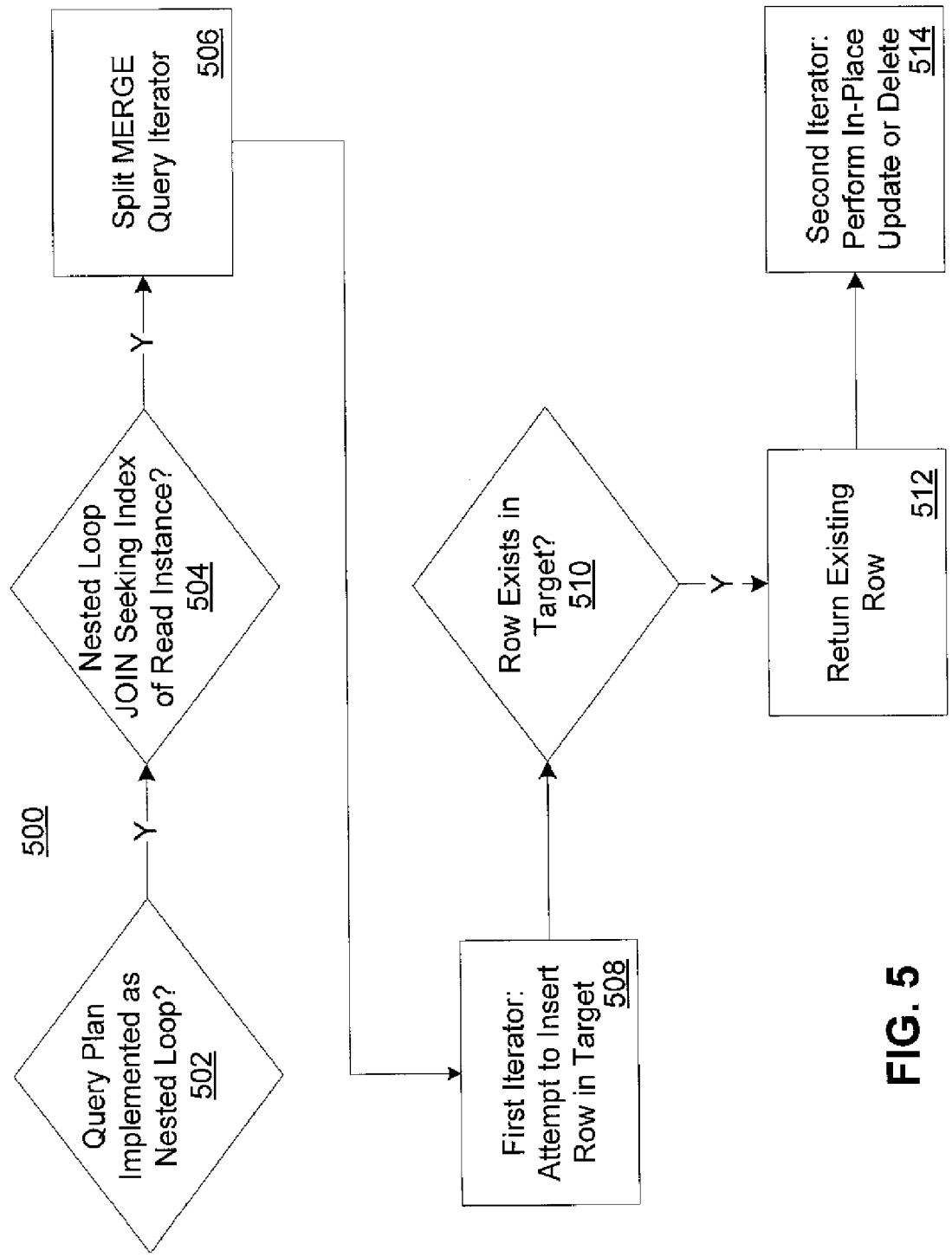
FIG. 5 is a flowchart of a method for execution of MERGE statements seeking a "Read Instance" of a target.

Optimized Execution of MERGE Statements Seeking a "Read Instance" of a Target Table FIG. 5 is a flowchart of a method 500 for execution of MERGE statements seeking a "Read Instance" of a target. This optimization applies to query plans where the join between the source and the target is implemented as a nested loop join that seeks an index of the "Read Instance" of the target. The optimization will guarantee that any kind of MERGE action (i.e., insert, update, or delete) requires only a single B-Tree traversal per affected row. In other words, when the optimization is enabled, each action will be performed in the target with one B-Tree traversal.

According to the method 500, a determination is made, at 502, as to whether a MERGE query plan is implemented as a nested loop. If, at 502, it is determined that the MERGE query plan is implemented as a nested loop, then, at 504, a determination is made as to whether the nested loop join seeks an index of the "Read Instance" of the target. If, at 504, it is determined that the nested loop join seeks an index of the "Read Instance" of the target, then, at 506, the MERGE Query Execution iterator may be split into two iterators.

At 508, the first iterator may attempt to insert a row in the target. The Storage Engine API used to insert a row may be augmented with an optional parameter telling it that, instead of throwing a unique key violation when the row already exists in the target index, the already-existing row should be returned to the caller instead. So, if it is determined, at 510, that the row already exists in the target, then, at 512, the already-existing row may be returned to the caller. The caller can then pass the row to the Storage Engine API used to update or delete. Thus, the output of the first MERGE iterator may be consumed by a second MERGE iterator on top to perform an in-place update or delete, at 514, according to the MERGE statement syntax.

Thus, an insertion maybe attempted before proving whether the row exists already, and, in that case, the already existing row may be used instead of generating a unique key violation error. Because of the algorithm employed, the optimization can only be enabled when the target table index being sought is unique.

What is claimed is:

1. A method for Halloween Protection detection for MERGE statements, the method comprising:
   during a compile phase, detecting a MERGE statement in a Data Manipulation Language file;
   analyzing a syntax of the MERGE statement to locate a WHEN MATCHED THEN UPDATE clause;
   determining whether key or partitioning columns of an index being scanned or sought of a Read Instance intersect with columns being updated in the WHEN MATCHED THEN UPDATE clause; and
   when the key or partitioning columns of the index being scanned or sought of the Read Instance intersect with the columns being updated in the WHEN MATCHED THEN UPDATE clause, then providing Halloween Protection in a query plan for execution of the MERGE statement.

2. The method of claim 1, further comprising:
   determining that Halloween Protection is not required unless the key or partitioning columns of the index being scanned or sought of the Read Instance intersect with the columns being updated in the WHEN MATCHED THEN UPDATE clause of the MERGE statement.

3. The method of claim 1, wherein the Halloween protection prevents the MERGE statement from processing a specified row more than once.

4. The method of claim 3, wherein processing the specified row comprises inserting the specified row into a target, updating the specified row in the target, or deleting the specified row from the target.

5. The method of claim 1, wherein the Read Instance is an instance of a target joined with a source.

6. The method of claim 1, further comprising:
   determining whether a target is a heap that is being scanned as a read instance;

determining whether the MERGE statement contains a WHEN NOT MATCHED THEN INSERT clause; and upon a determination that the target is a heap that is being scanned as a read instance and that the MERGE statement contains a WHEN NOT MATCHED THEN INSERT clause, then determining that Halloween Protection is required.

7. The method of claim 1, further comprising:

determining whether a source and target are joined with a merge join;

determining whether the MERGE statement is hole-filling for merge join keys associated with the target; and upon a determination that the source and target are joined with a merge join and that the MERGE statement is not hole-filling for the target merge join keys, then determining that Halloween Protection is required.

8. The method of claim 7, wherein the MERGE statement is determined to be hole-filling for a column in the target if an INSERT clause in the MERGE statement exactly populates a value that was found missing in a WHEN NOT MATCHED clause in the MERGE statement.

9. The method of claim 7, wherein the MERGE statement is determined to be hole-filling for a column in the target if the column is involved in a join predicate between the source and the target, and the MERGE statement contains a WHEN NOT MATCHED THEN INSERT clause that assigns to the column a value to which the column is being compared in the join predicate.

10. The method of claim 1, further comprising:

determining whether a source and target are joined with a nested loop join;

determining whether the MERGE statement is hole-filling for keys of the Read Instance index being sought, the keys being compared with source join keys in a seek predicate; and upon a determination that the source and target are joined with a nested loop join and that the MERGE statement is not hole-filling for the keys of the Read Instance index being sought, then determining that Halloween Protection is required.

11. A method for prevention of non-deterministic MERGE statements, the method comprising:

during a compile phase, detecting a MERGE statement in a Data Manipulation Language file;

analyzing a syntax of the MERGE statement to locate at least one of a WHEN MATCHED THEN DELETE clause and a WHEN MATCHED THEN DELETE clause;

determining whether the MERGE statement contains either a WHEN MATCHED THEN UPDATE or a WHEN MATCHED THEN DELETE clause;

upon a determination that the MERGE statement contains either a WHEN MATCHED THEN UPDATE or a WHEN MATCHED THEN DELETE clause, then determining whether a source has a unique index on join keys; and upon a determination that the source does not have a unique index on the join keys, then augmenting a query plan associated with the MERGE statement with an operator that is adapted to raise an error preventing multiple attempts to update a specified row and to discard duplicate attempts to delete a previously-deleted row.

12. The method of claim 11, further comprising:

determining that the MERGE statement contains a WHEN MATCHED THEN DELETE clause;

augmenting the query plan with an operator that computes a Ranking Window Function, wherein the Ranking Window Function maintains a counter partitioned by the target keys, and increments the counter whenever the action being attempted against the target is a DELETE; and removing rows with a count greater than one to discard duplicate attempts to delete the same row.

13. The method of claim 11, further comprising:

determining that the MERGE statement contains a WHEN MATCHED THEN UPDATE clause;

augmenting the query plan with an operator that computes a Ranking Window Function, wherein the Ranking Window Function maintains a counter partitioned by the target keys, and increments the counter whenever the action being attempted against the target is an UPDATE or a DELETE; and raising an error if the counter for a given row reaches two.

14. The method of claim 11, wherein determining whether the MERGE statement contains either a WHEN MATCHED THEN UPDATE or a WHEN MATCHED THEN DELETE clause and determining whether the source has a unique index on the join keys occurs during compilation of the MERGE statement.

15. A method for in-place inserts for MERGE statements scanning a Read Instance of a target, the method comprising:

determining whether a query plan associated with a MERGE statement contains Halloween protection;

determining whether a source and a target are being scanned with a merge join;

determining whether a match is found on the target; and upon a determination that the query plan does not contain Halloween protection, that the source and target are being scanned with a merge join, and that a match is not found on the target, then augmenting a Storage Engine API used to insert a row with an optional parameter containing a page reference.

16. The method of claim 15, further comprising:

invoking the augmented Storage Engine API with a reference to a currently outstanding page of the target index scan.

17. The method of claim 16, wherein, when the page reference is present, the Storage Engine determines whether the page is the one where a new row needs to be inserted by comparing the lowest and highest index key column values for rows currently stored in the page, and, if the key of the new row to be inserted fits in between, then performing the insert directly inside the page.

18. A method for execution of MERGE statements seeking a Read Instance of a target, the method comprising:

during a compile phase, detecting a MERGE statement in a Data Manipulation Language file;

analyzing the MERGE statement to determine MERGE statement syntax;

determining whether a MERGE query plan associated with the MERGE statement is implemented as a nested loop join;

upon a determination that the MERGE query plan is implemented as a nested loop join, determining whether the nested loop join seeks an index of a Read Instance of a target;

upon a determination that the MERGE query plan is implemented as a nested loop join that seeks an index of a Read Instance, then augmenting a first application program interface (API) with a parameter that enables the first API to return an already-existing row to the caller instead of generating a unique key violation when the row already exists in the target index;

passing the already-existing row to a second API to enable the second API to perform an in-place update or delete according to the MERGE statement syntax.

19. The method of claim 18, further comprising splitting a MERGE Query Execution iterator into first and second iterators, wherein the first iterator attempts to insert the row in the target, and wherein the second iterator performs one of an in-place update and delete.

20. The method of claim 18, wherein the first API is a Storage Engine API used to insert a row, and wherein the second API is an API used to update or delete a row.

* * * * *